United States Patent [19]

Stanfield et al.

[11] Patent Number: 4,740,864
[45] Date of Patent: Apr. 26, 1988

[54] HORIZONTAL BUS BAR SPLICE FOR CONTROL CENTER

[75] Inventors: Harold W. Stanfield, Mequon, Wis.; Richard A. Von Rotz, Peru, Ind.

[73] Assignee: Square D Company, Palatine, Ill.

[21] Appl. No.: 898,175

[22] Filed: Aug. 20, 1986

[51] Int. Cl.⁴ ............................................. H02B 1/04
[52] U.S. Cl. .................................... 361/341; 361/355; 361/361
[58] Field of Search ............... 361/361, 341, 346, 355, 361/338, 342

[56] References Cited

U.S. PATENT DOCUMENTS 3,482,143 12/1969 Stark et al. .......................... 361/338
3,495,135 2/1970 Paape ................................... 361/338
4,502,097 2/1985 Takahashi ........................... 361/342

Primary Examiner—Robert S. Macon
Attorney, Agent, or Firm—Mary R. Jankousky; Thomas B. Lindgren

[57] ABSTRACT

A slidable splice plate assembly for physically and electrically connecting the horizontal bus bars of adjacent sections of control centers. The electrically connecting splice bars and the insulating splice slide plate are preassembled and connected to a single horizontal bus within a control center section bar for shipment. After two adjacent sections of control center have been placed side by side, the splice plate assembly of the first control center section is moved over to overlap and be physically connected to the horizontal bus bar of the adjacent control center section.

11 Claims, 4 Drawing Sheets

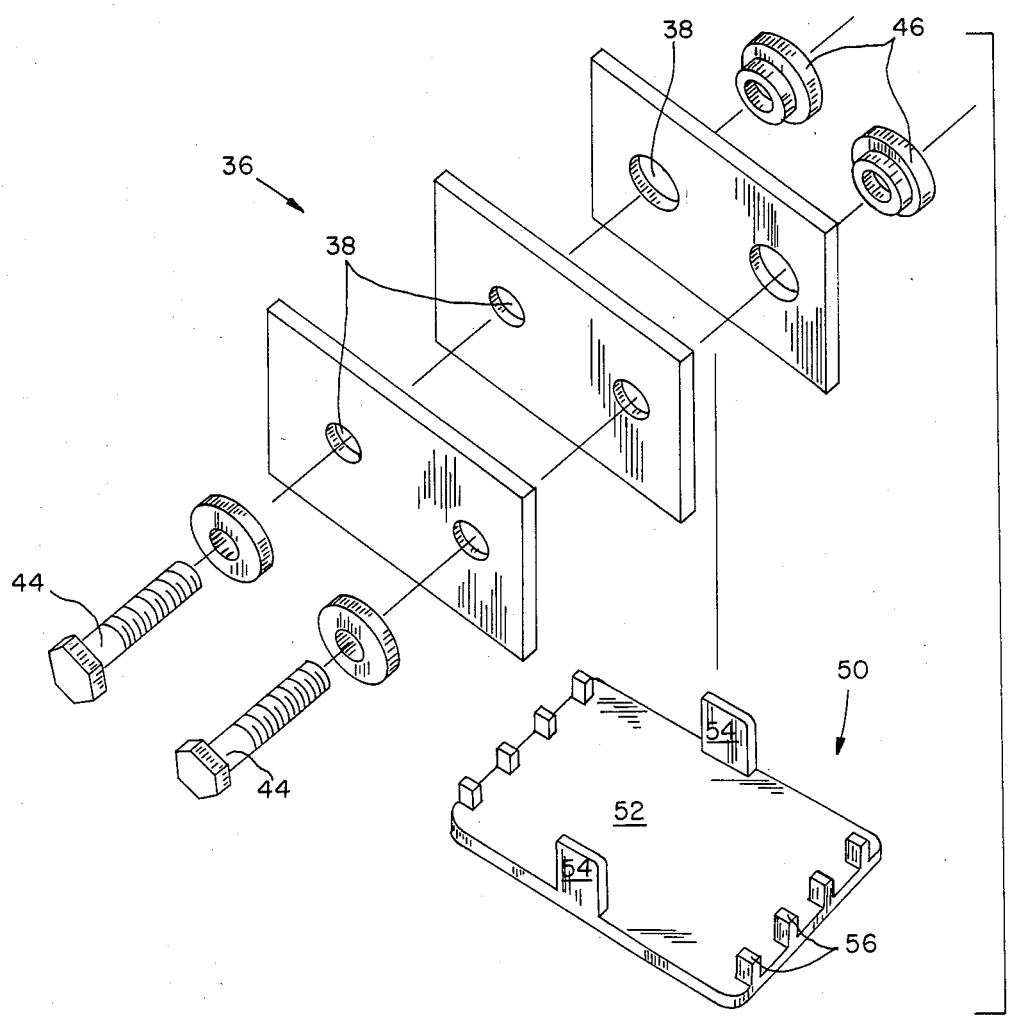
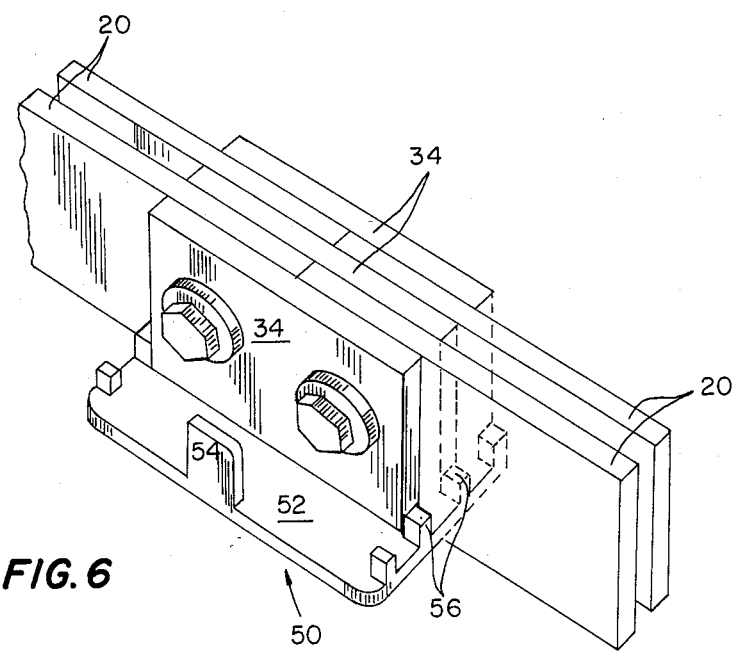

HORIZONTAL BUS BAR SPLICE FOR CONTROL CENTER

BACKGROUND OF THE INVENTION

This invention relates to a control center composed of a number of sections that are placed side by side and are electrically connected by horizontal bus bars.

Control centers frequently are made up of a group of control center sections that are placed side by side. Each section contains one or more control units stacked one on top of the other. Electrical power is supplied to the control center by main horizontal bus bars which extend continuously across the upper portion of all of the individual sections. These horizontal bus bars deliver current from a source of supply to vertical bus bars located in each section. The vertical bus bars in turn deliver current to the individual control unit via a switch, circuit breaker, motor starter or other disconnect device, such as that described in Ser. No. 898,474, filed Aug. 20, 1986, entitled "Advanceable and Retractable Plug-on Unit Assembly for a Motor Control Center" by S. Ledbetter and R. Cox filed simultaneously herewith and herein incorporated by reference. Other aspects of the control center are more completely described in Ser. No. 898,178, entitled "Control Center Unit Shelf Assembly", filed Aug. 20, 1986, and Ser. No. 898,179, entitled "Control Unit Height Adapter", filed Aug. 20, 1986, both by H. W. Stanfield and R. Von-Rotz, also filed simultaneously herewith and incorporated by reference herein.

Shipping limitations prevent an entire control center from being shipped completely assembled. One, two or three control center sections are generally shipped together as a shipping split. The shipping splits are then placed side by side at the site and assembled as a complete control center.

In addition to connecting the frames of adjacent shipping splits, the main horizontal bus bars of the adjacent sections must be connected. In the prior art the horizontal bus bars of adjacent shipping splits were connected with splice plates that were supplied by the control center manufacturer. The bus bar splice plate and bolts or other connectors were shipped loose and were often lost or misplaced.

In the prior art there were also problems in making the splice connection because of the location of the horizontal bus bars in the back of the control center. The lack of space often required the removal of the top control unit, the structural members supporting the horizontal bus bar and/or other structural components prior to installing the splice plates. A customer who after installing the control center later desires to add sections to the control center will face considerable down time of the control center and considerable expense in connecting the horizontal bus bars of the existing control center to that of the new control center section.

It is an object of the present invention to provide a horizontal bus bar splice that is easily and quickly adapted to make the electrical connection between the horizontal bus bars of adjacent sections.

It is a further object of this invention to provide a horizontal bus bar splice that is self-contained within the bus bar assembly.

Further objects and features of the invention will be readily apparent to those skilled in the art from the specification and appended drawings illustrating certain preferred embodiments.

SUMMARY OF THE INVENTION

The present invention relates to a control center made up of a number of sections positioned side by side. Electrical power is supplied to horizontal bus bars which run across the back of all of the individual sections. Because of shipping limitations a control center is not shipped as a complete unit but in shipping splits of one, two or three sections. When the control center is installed, both the frames and the horizontal bus bar assemblies of adjacent shipping slips must be connected.

All control centers sections will contain one or more phases of horizontal bus bars. Each phase of the horizontal bus bar assembly comprises one or more bus bars mounted parallel to one another. Each pair of adjacent bus bars is spaced apart in the horizontal direction and is separated by an air space. A slidable splice plate assembly connects each corresponding phase of the horizontal bus bars in adjacent sections. A splice plate assembly includes a number of splice bars equal to the number of horizontal bus bars per phase plus one. Each splice bar is positioned adjacent a horizontal bus bar or between two adjacent horizontal bus bars to sandwich each of the bus bars there between. The splice bars are positioned on a splice slide plate which is formed of an insulating material. A bolt and clinch nut connect the splice bars and horizontal bus bars together.

When a shipping split is prepared for shipping, the splice plate assembly is slid completely within one section. At the site the frames of adjacent shipping sections are connected together. The bolt is removed from the splice plate assembly and the splice slide plate moved to a position wherein the splice bars overlap the horizontal bus bars of each of the adjacent sections. A bolt is then inserted through the horizontal bus bars of each section and the splice bars to complete the electrical connection between sections.

BRIEF DESCRIPTION OF THE DRAWINGS

FIG. 5 is an exploded view of a splice plate assembly.

FIG. 6 is a perspective view of a splice plate assembly.

DESCRIPTION OF THE PREFERRED EMBODIMENT

Figure 7:
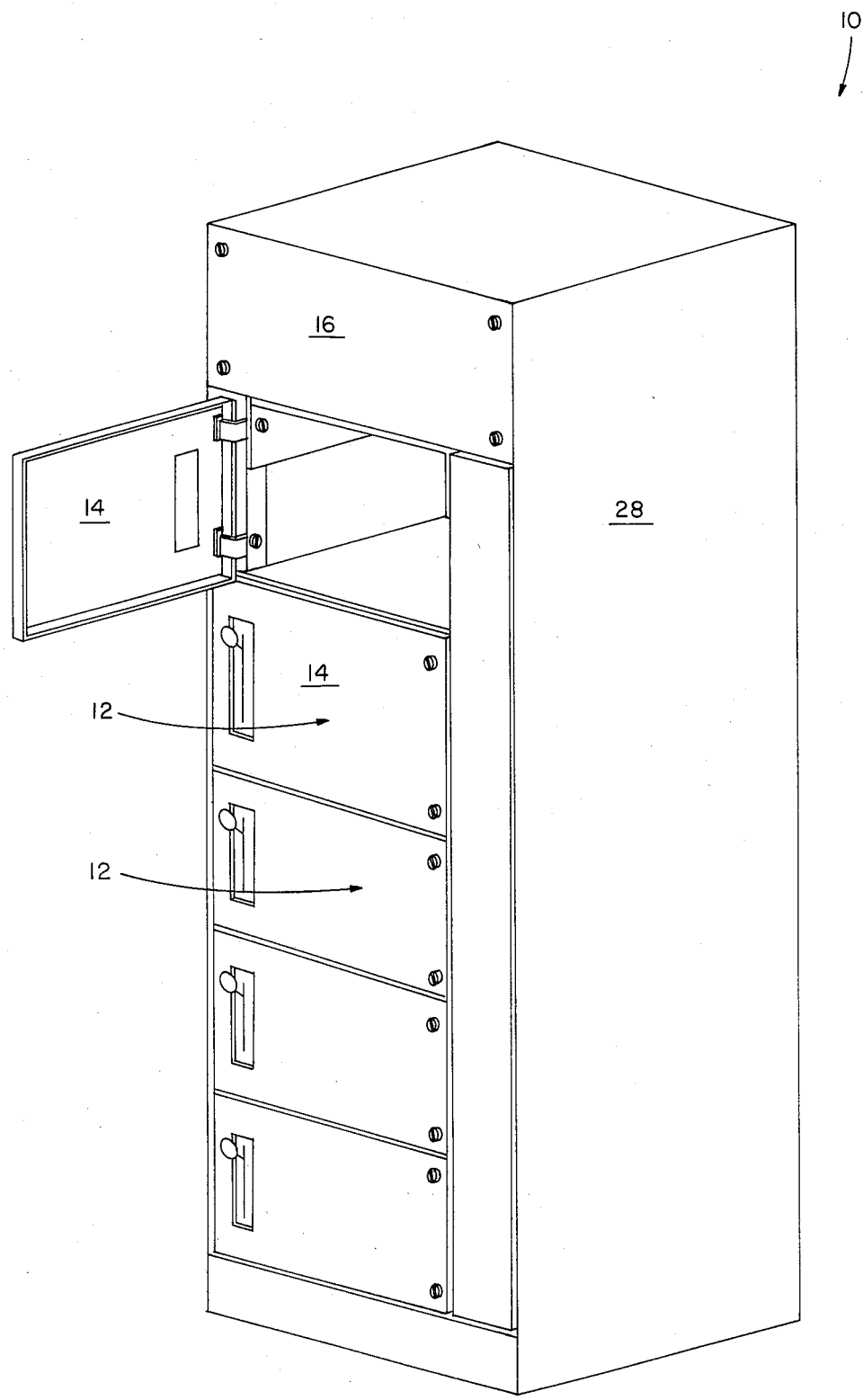
FIG. 7 is a perspective view of a motor control center section with a control unit removed.

By way of background information, referring initially to FIG. 7 of the drawings, there is illustrated a motor control center section 10, comprising a number of individual control units 12 positioned one on top of the other. One control unit 12 has been removed from the section shown in FIG. 7. A door 14 covers each control unit. Horizontal bus bar cover 16, at the top of the control center section, covers the area housing the horizontal bus bars 20 and the connection to the vertical bus bars 22. A supply source provides electrical power through the horizontal bus bars 20 and vertical bus bars 22 to the individual control units 12.

Figure 1:
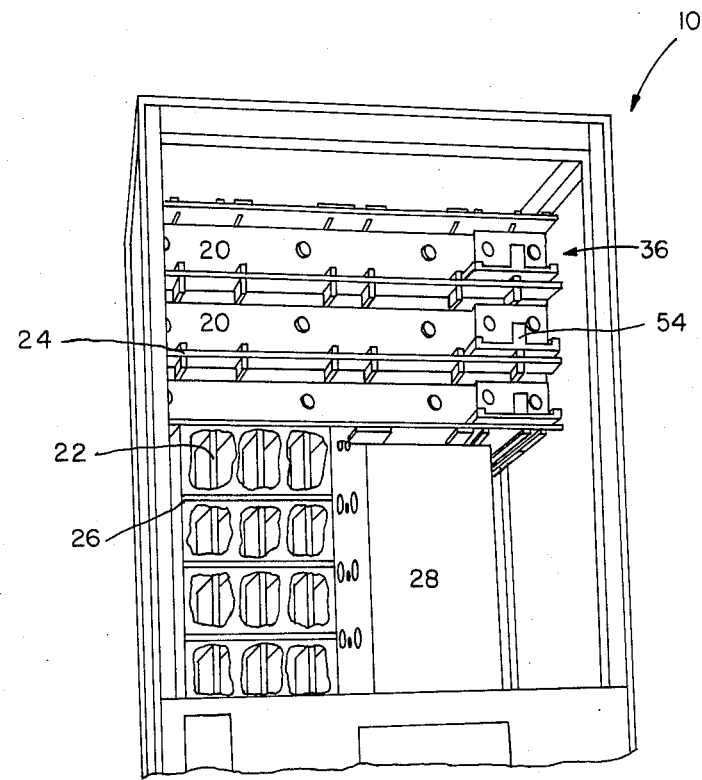
FIG. 1 is a partial perspective view of the upper portion of a motor control center section with control units, door and covers removed.

Referring to FIG. 1, and continuing by way of background information, both the horizontal bus bars 20 and vertical bus bars 22 are held in the proper position by horizontal supports 24 and vertical supports 26, respectively. The horizontal supports 24 and vertical supports 26 are formed of glass polyester, an insulating material. In addition to providing support, the horizontal supports 24 also physically separate each phase of the horizontal bus bars from the other phases and also from the metal cabinet 28. The vertical supports 26 likewise physically separate the phases of the vertical bus bar from each other and from the cabinet 28. The bus bars are thus totally isolated and insulated within each control center section.

As shown in FIGS. 1, 2, 3 and 4, each phase of the horizontal bus bar assembly includes one or more horizontal bus bars 20. The bus bars of a single phase are parallel to one another and are held a fixed space from one another by five-sixteenth inch spacers (not shown) located at each of the two main bolts 30. The splice bars 34 are slightly less than five-sixteenth inches in thickness to enable them to slide between two adjacent horizontal bus bars 20.

Because of shipping limitations a control center generally cannot be shipped fully assembled. One, two or three sections of the control center may be shipped as a shipping split. After the shipping splits arrive at the site and are properly placed side by side, their frames are connected together. The electrical connection between the horizontal bus bars of the adjacent shipping splits must then be made. Each phase of the adjacent horizontal bus bars is connected by a splice plate assembly 36.

A splice plate assembly 36 includes a number of splice bars 34 seated on a splice slide plate 50 made of an insulating material such as glass polyester. The splice slide plate 50 comprises a base 52 having a vertical tab 54 on each of two opposite sides. Each end has three or four nubs 56 spaced apart and positioned on the base 52. A splice bar 34 is positioned between the first nubs 56 located on each end of the splice slide plate 50. A second splice bar 34 is positioned between the second nub on each end of the splice slide plate 50, and so forth, so that the splice bars 34 are positioned parallel to one another. The number of splice bars 34 for each phase is equal to the number of horizontal bus bars 20 plus one. When the splice plate assembly 36 has connected the horizontal bus bars of one phase of adjacent shipping splits, each individual bus bar 20 is sandwiched between two splice bars 34.

Figure 2:
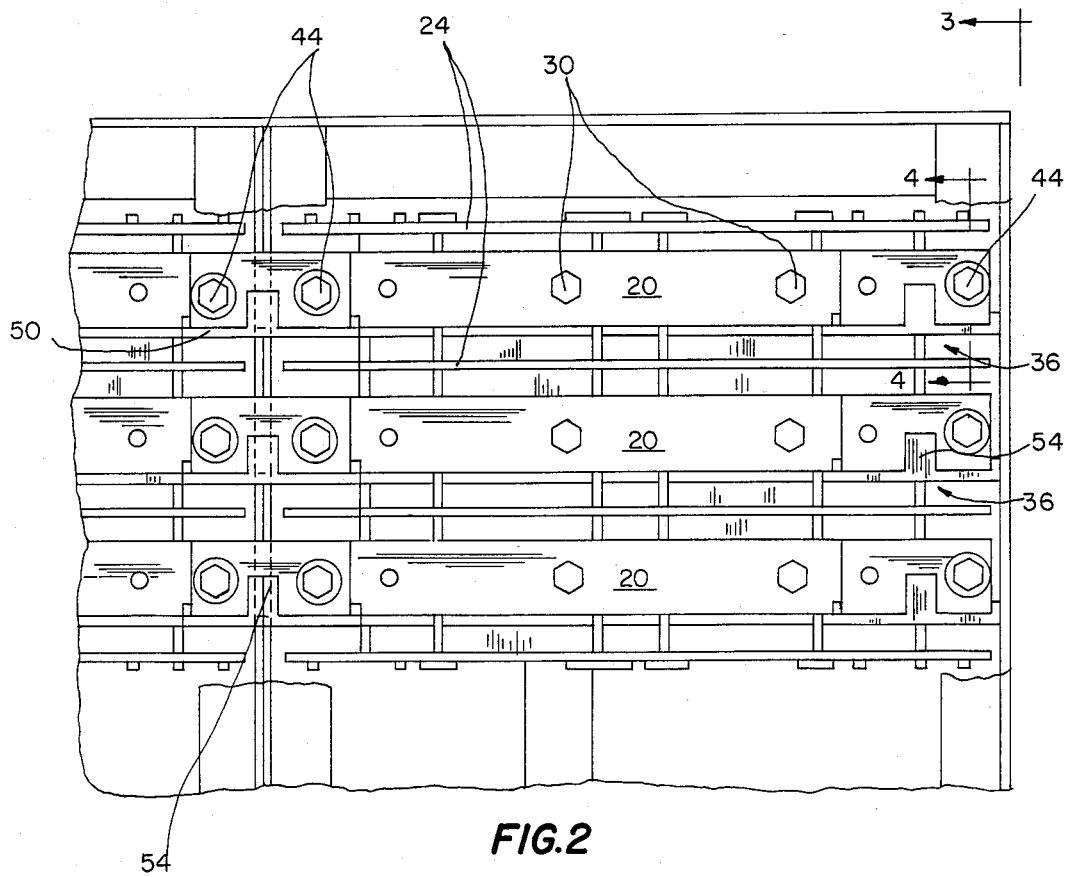
FIG. 2 is a partial front view of the horizontal bus bars of two adjacent control center sections.
Figure 3:
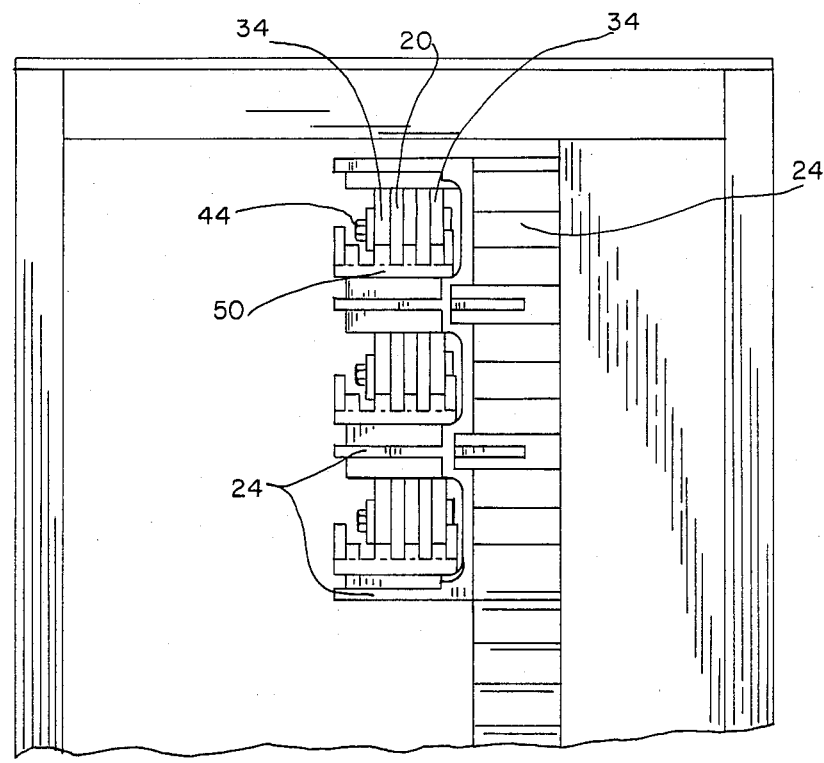
FIG. 3 is a sectional view of the horizontal bus bar assembly and splice plate assembly taken along lines 3—3 of FIG. 2.
Figure 4:
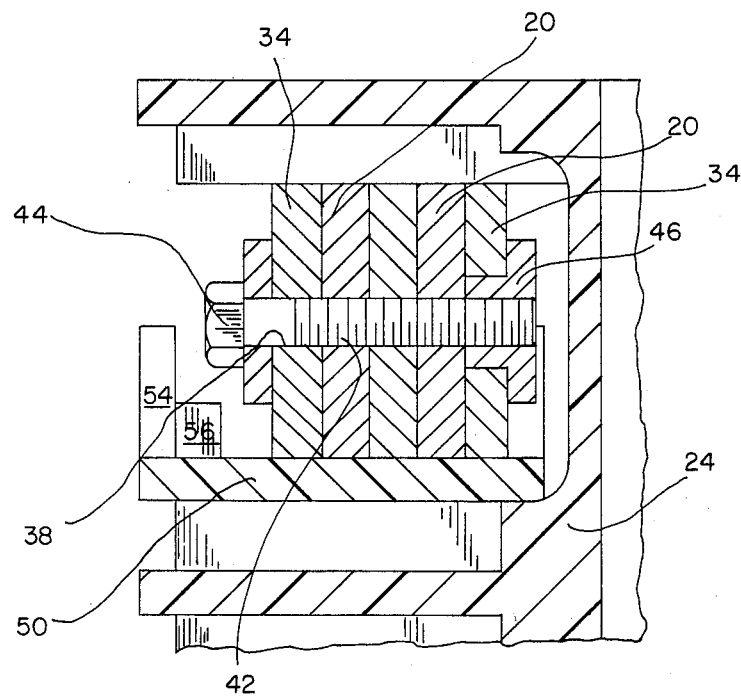
FIG. 4 is a sectional view of the horizontal bus bar assembly and supports taken along lines 4—4 of FIG. 2.

When the shipping split is transported to the site the splice plate assembly 36 is positioned so that the ends of the splice bars 34 are flush with the ends of the respective horizontal bus bars 20. When the shipping splits are placed side by side at the site, the splice plate assembly 36 is moved in the direction that is to the right as shown in FIG. 2, to position the holes 38 of the splice bars 34 directly in front of the holes 42 of the bus bars 20. Bolts 44 or suitable fasteners are then placed through the respective holes 38 and 42 to mate with the clinch nut 46 held in the hole 38 of the splice bar 34 that is in the rear of the assembly.

This design provides for easy assembly and for making quick electrical connections between the horizontal bus bars in adjacent control center sections. Parts which otherwise might be easily lost are readily accessible.

The prearranged splice plate assembly 36 also facilitates the proper insulating arrangement for the electrically connected horizontal bus bars.

While the invention has particularly been shown and described with reference to a preferred embodiment it will be understood by those skilled in the art that variations in form, construction and arrangement may be made therein without departing from the spirit and scope of the invention.

We claim:

1. An electrical bus bar structure in a plurality of electrical cabinets, said bus bar structure comprising:

a first horizontal bus bar and a second horizontal bus bar, each horizontal bus bar having a rectangular cross section and is located in a separate electrical cabinet, each horizontal bus bar having a first end and a second end opposite the first end, said horizontal bus bars being positioned in substantially the same plane;

two electrical splice bars having a flat surface, one of said splice bars being positioned on each side of said first horizontal bus bar;

a splice slide plate positioned underneath said splice bars and said first horizontal bus bar, said splice slide plate holding said splice bars and sliding said splice bars between a first position wherein said splice bars overlap an end of said first horizontal bus bar, and a second position wherein said splice bars overlap both adjacent ends of said adjacent horizontal bus bars, said splice slide plate being held captive within the electrical cabinets in either the first position or the second position.

2. An electrical bus bar structure as claimed in claim 1 additionally comprising two connectors for forming an electrical connection between said horizontal bus bars when said splice slide plate is in the second position, each of said connectors connecting said splice bar to one end of said first horizontal bus bars.

3. An electrical bus bar structure as claimed in claim 1 wherein said splice bars are positioned substantially parallel to one another and a predetermined distance from one another when facilitating the electrical connection between the adjacent ends of the horizontal bus bars.

4. An electrical bus bar structure as claimed in claim 3 wherein said splice slide plate comprises a base having two ends with a plurality of spaced apart vertical tabs, each tab on one end having a corresponding tab on the other end, wherein each of said splice bars comprises two ends each positioned adjacent one of a corresponding pair of tabs.

5. An electrical bus bar assembly for providing electrical power to a plurality of electrical cabinets mounted adjacent to one another, said bus bar assembly comprising:

a horizontal bus bar positioned in each cabinet, each bus bar having an axis and said bus bars being substantially coaxial;

two splice bars positioned adjacent said bus bars, each of said splice bars having an axis substantially parallel to the axes of said bus bars, one of said splice bars being positioned on each side of said bus bars;

a splice slide plate holding said splice bars, said splice slide plate being movable between a first position wherein said splice bars are contiguous only with one of said bus bars and a second position wherein said splice bars are contiguous with both of said bus bars; and connecting means for connecting said splice bar to one bus bar in the first position and to two of said bus bars in the second position.

6. An electrical bus bar assembly as claimed in claim 5 wherein each of said bus bars has two opposite ends and includes a hole near each of its ends, wherein each of said splice bars has two opposite ends and includes a hole near each end, wherein said bus bar assembly additionally comprises a bolt, passing through a respective hole of said splice bar and said bus bar.

7. An electrical bus bar assembly for providing electrical power to a plurality of adjacent electrical cabinets, each cabinet having a face contiguous with the face of an adjacent cabinet, said bus bar assembly comprising:

a plurality of horizontal bus bars mounted in each cabinet, each of said bus bars having an axis, two opposite faces and being approximately rectangular in cross-section, said bus bars in each cabinet being parallel to one another with a predetermined spacing from one another, the axis of each of said bus bars being approximately coextensive with the axis of a corresponding bus bar in an adjacent cabinet, each face of a bus bar being coextensive with a corresponding face of a bus bar in an adjacent cabinet, a plurality of splice bars, each splice bar having an axis, two opposite faces, and being approximately rectangular in cross section, said splice bars being parallel to one another with a predetermined spacing from one another, a face of each of said splice bars being movable between a first position wherein the face is contiguous with the face of one of said bus bars and a second position wherein the face is contiguous with the corresponding faces of two of said bus bars in adjacent cabinets, said splice being entirely positioned within one of the cabinets in position one; and a splice slide plate holding said splice bars and being movable between the first position and the second position.

8. An electrical bus bar assembly as claimed in claim 7 wherein said splice bars and said splice slide plate are held captive within the cabinets in both the first position and the second position.

9. An electrical bus bar assembly as claimed in claim 7 wherein said splice slide plate is made of an insulating material.

10. An electrical bus bar assembly as claimed in claim 7 wherein said splice slide plate comprises a base having two opposite ends, each end having a plurality of vertical tabs, each of said splice bars being positioned between two tabs on opposite ends of said base.

11. An electrical bus bar assembly as claimed in claim 10 additionally comprising two connectors, each connector connecting said splice bars in the second position to the horizontal bus bars in one of the adjacent cabinets.

* * * * *